(12) United States Patent
Weber et al.

(10) Patent No.: US 11,077,593 B2
(45) Date of Patent: *Aug. 3, 2021

(54) HOUSINGS FOR ELECTRONIC DEVICES

(71) Applicant: Apple Inc., Cupertino, CA (US)

(72) Inventors: Douglas Weber, San Francisco, CA (US); Stephen P. Zadesky, Portola Valley, CA (US); Stephen Brian Lynch, Portola Valley, CA (US)

(73) Assignee: APPLE INC., Cupertino, CA (US)

( * ) Notice: Subject to any disclaimer, the term of this patent is extended or adjusted under 35 U.S.C. 154(b) by 333 days.

This patent is subject to a terminal disclaimer.

(21) Appl. No.: 16/278,022

(22) Filed: Feb. 15, 2019

(65) Prior Publication Data

US 2019/0176379 A1  Jun. 13, 2019

Related U.S. Application Data

(60) Continuation of application No. 15/178,499, filed on Jun. 9, 2016, now Pat. No. 10,245,770, which is a
(Continued)

(51) Int. Cl.
*B29C 45/16* (2006.01)
*B29C 37/00* (2006.01)
(Continued)

(52) U.S. Cl.
CPC ........ *B29C 45/1657* (2013.01); *B23K 26/382* (2015.10); *B29C 37/0082* (2013.01);
(Continued)

(58) Field of Classification Search
CPC ............ B29C 45/1657; B29C 37/0082; B29C 45/14311; B29C 45/1671;
(Continued)

(56) References Cited

U.S. PATENT DOCUMENTS 2,647,079 A  7/1953  Burnham
3,526,694 A  9/1970  Lemelson
(Continued)

FOREIGN PATENT DOCUMENTS

DE  1116998  11/1961
DE  19523112  6/1996
(Continued)

OTHER PUBLICATIONS

Annerfors et al., "Nano Molding Technology on Cosmetic Aluminum Parts in Mobile Phones," Division of Production and Materials Engineering, LTH, 2007.
(Continued)

*Primary Examiner* — James C Yager

(74) *Attorney, Agent, or Firm* — Brownstein Hyatt Farber Schreck, LLP

(57) ABSTRACT

Methods and apparatus for applying internal features or complex mechanical structures to a surface of a metal part are disclosed. According to one aspect of the present invention, a method for creating an assembly that includes a substrate and a molded piece involves obtaining the substrate, and forming at least one binding feature on a surface of the substrate. The method also includes molding on a surface of the binding feature and the surface of the substrate. Molding on the surface of the binding feature and the surface of the substrate mechanically binds the molded piece to the substrate.

18 Claims, 11 Drawing Sheets

Related U.S. Application Data continuation of application No. 13/488,309, filed on Jun. 4, 2012, now Pat. No. 9,387,612, which is a division of application No. 11/964,652, filed on Dec. 26, 2007, now Pat. No. 8,192,815.

(60) Provisional application No. 60/949,780, filed on Jul. 13, 2007.

(51) Int. Cl.

| | | |
|---|---|---|
| B29C 45/14 | (2006.01) | |
| B23K 26/382 | (2014.01) | |
| C23F 1/00 | (2006.01) | |
| C23F 1/16 | (2006.01) | |
| B29K 705/00 | (2006.01) | |
| B29L 31/34 | (2006.01) | |
| B29K 55/02 | (2006.01) | |
| B29K 69/00 | (2006.01) | |

(52) U.S. Cl.
 CPC .... *B29C 45/14311* (2013.01); *B29C 45/1671* (2013.01); *C23F 1/00* (2013.01); *C23F 1/16* (2013.01); *B29C 45/14344* (2013.01); *B29C 2045/14327* (2013.01); *B29K 2055/02* (2013.01); *B29K 2069/00* (2013.01); *B29K 2705/00* (2013.01); *B29L 2031/3481* (2013.01); *B32B 2355/02* (2013.01); *B32B 2369/00* (2013.01); *B32B 2457/00* (2013.01); *Y10T 428/13* (2015.01); *Y10T 428/1352* (2015.01); *Y10T 428/1355* (2015.01); *Y10T 428/24008* (2015.01); *Y10T 428/24273* (2015.01); *Y10T 428/24521* (2015.01); *Y10T 428/31678* (2015.04)

(58) Field of Classification Search
 CPC .... B29C 45/14344; B29C 2045/14327; B23K 26/382; C23F 1/00; C23F 1/16; B29K 2055/02; B29K 2069/00; B29K 2705/00; B32B 2355/02; B32B 2369/00; B32B 2457/00; B29L 2031/3481; Y10T 428/31678; Y10T 428/24521; Y10T 428/1355; Y10T 428/24273; Y10T 428/1352; Y10T 428/13; Y10T 428/24008
 See application file for complete search history.

(56) References Cited

U.S. PATENT DOCUMENTS

| | | | |
|---|---|---|---|
| 4,269,947 | A | 5/1981 | Inata et al. |
| 4,531,705 | A | 7/1985 | Nakagawa et al. |
| 4,547,649 | A | 10/1985 | Butt et al. |
| 4,564,001 | A | 1/1986 | Maeda |
| 4,993,148 | A | 2/1991 | Adachi et al. |
| 5,417,905 | A | 5/1995 | Lemaire et al. |
| 5,672,405 | A | 9/1997 | Plank et al. |
| 5,837,086 | A | 11/1998 | Leeb et al. |
| 5,872,699 | A | 2/1999 | Nishii et al. |
| 5,925,847 | A | 7/1999 | Rademacher et al. |
| 6,101,372 | A | 8/2000 | Kubo |
| 6,331,239 | B1 | 12/2001 | Shirota et al. |
| 6,480,397 | B1 | 11/2002 | Hsu et al. |
| 6,574,096 | B1 | 6/2003 | Difonzo et al. |
| 6,966,133 | B2 | 11/2005 | Krings et al. |
| 6,996,425 | B2 | 2/2006 | Watanabe |
| 7,105,584 | B2 | 9/2006 | Chambers et al. |
| 7,134,198 | B2 | 11/2006 | Nakatani et al. |
| 7,181,172 | B2 | 2/2007 | Sullivan et al. |
| 7,225,529 | B2 | 6/2007 | Wang |
| 7,459,373 | B2 | 12/2008 | Yoo |
| 7,622,183 | B2 | 11/2009 | Shirai et al. |
| 7,691,189 | B2 | 4/2010 | En et al. |
| 2002/0097440 | A1 | 7/2002 | Paricio et al. |
| 2002/0109134 | A1 | 8/2002 | Iwasaki et al. |
| 2002/0130441 | A1 | 9/2002 | Robinson et al. |
| 2002/0160145 | A1 | 10/2002 | Bauhoff |
| 2003/0006217 | A1 | 1/2003 | Dance |
| 2004/0104509 | A1 | 6/2004 | Nakada |
| 2005/0023022 | A1 | 2/2005 | Kriege et al. |
| 2005/0034301 | A1 | 2/2005 | Wang |
| 2005/0115840 | A1 | 6/2005 | Dolan |
| 2005/0158576 | A1 | 7/2005 | Groll |
| 2006/0055084 | A1 | 3/2006 | Yamaguchi et al. |
| 2006/0066771 | A1 | 3/2006 | Hayano et al. |
| 2006/0105542 | A1 | 5/2006 | Yoo |
| 2007/0018817 | A1 | 1/2007 | Marmaropoulos et al. |
| 2007/0045893 | A1 | 3/2007 | Asthana et al. |
| 2007/0053504 | A1 | 3/2007 | Sato et al. |
| 2007/0131012 | A1 | 6/2007 | Eipper et al. |
| 2007/0275263 | A1 | 11/2007 | Groll |
| 2009/0017242 | A1 | 1/2009 | Weber et al. |
| 2009/0104949 | A1 | 4/2009 | Sato et al. |
| 2009/0190290 | A1 | 7/2009 | Lynch et al. |
| 2009/0236143 | A1 | 9/2009 | Nakamura |
| 2009/0260871 | A1 | 10/2009 | Weber |
| 2009/0305168 | A1 | 12/2009 | Heley et al. |
| 2010/0065313 | A1 | 3/2010 | Takeuchi et al. |
| 2010/0294426 | A1 | 11/2010 | Nashner |
| 2011/0253411 | A1 | 10/2011 | Hum et al. |

FOREIGN PATENT DOCUMENTS

| | | |
|---|---|---|
| EP | 0114565 | 8/1984 |
| EP | 0633585 | 1/1995 |
| EP | 0997958 | 5/2000 |
| FR | 1102285 | 10/1955 |
| GB | 788329 | 12/1957 |
| JP | S5549240 | 4/1980 |
| JP | 03013331 | 1/1991 |
| JP | 03138131 | 6/1991 |
| JP | 06126192 | 5/1994 |
| JP | 2000000167 | 1/2000 |
| JP | 2008087409 | 4/2008 |
| WO | WO 01/34408 | 5/2001 |
| WO | WO 2005/016624 | 2/2005 |
| WO | WO 2006/124279 | 11/2006 |

OTHER PUBLICATIONS

Hara, Osamu; "Curing Agents for Epoxy Resins," Three Bond Co., 1990, p. 9; accessed at https://www.threebond.co.jp/en/technical/technicalnews/pdf/tech32.pdf on Nov. 25, 2014.

Sweet, A. J., "Detection of Susceptibility of Alloy 26-IS to Intergranular Attack," Intergranular Corrosion of Stainless Alloys, ASTM STP 656. R. F. Steigerwald, Ed., American Society for Testing and Materials, pp. 197-232, 1978.

"Laser Engraving," Wikipedia, Apr. 2005; accessed at http://en.wikipedia.org/w/index.php?title=Laser.sub.--engraving&oldid=122-86035 on Nov. 24, 2014.

"Marking Lasers: Marking without Limitations," Trumpf Inc., pp. 1-36, Sep. 10, 2007.

"Sputtering," Wikipedia, Feb. 2002; accessed at http://en.wikipedia.org/w/index.php?title=Sputtering&oldid=115970.

"Thermal Shock Resistant Conformal Coating," Product Data Sheet, Dymax Corporation, pp. 1-2, Jul. 9, 2007.

HOUSINGS FOR ELECTRONIC DEVICES

CROSS-REFERENCE TO RELATED APPLICATION

This application is a continuation patent application of U.S. patent application Ser. No. 15/178,499, filed Jun. 9, 2016 and titled "Housings for Electronic Devices," which is a continuation patent application of U.S. patent application Ser. No. 13/488,309, filed Jun. 4, 2012 and titled, "Methods and Systems for Forming a Dual Layer Housing," now U.S. Pat. No. 9,387,612, which is a divisional patent application of U.S. patent application Ser. No. 11/964,652, filed Dec. 26, 2007 and titled "Methods and Systems for Forming a Dual Layer Housing," now U.S. Pat. No. 8,192,815, which is a nonprovisional patent application of and claims the benefit of U.S. Provisional Patent Application No. 60/949,780, filed Jul. 13, 2007 and titled "Dual Layer Housing," the disclosures of which are hereby incorporated herein by reference in their entireties.

BACKGROUND OF THE INVENTION

Field of the Invention

The present invention relates to forming features on metal parts and, more particularly, to applying internal features of complex mechanical structures to the surface of a metal part.

Description of the Related Art

The manufacture of devices that include metal parts often includes the formation of features, e.g., complex mechanical structures, on surfaces of the metal parts. In order to ensure the structural integrity of such features, the features are often affixed to the surfaces of the metal parts using an adhesive material. By way of example, an internal feature has been obtained and glued in an appropriate location on a surface of a metal parts or housings.

Alternatively, internal features have been welded to the surface of metal parts or housings. Utilizing a welding process to attach internal features to metal parts is limiting in terms of the number and the complexity of the internal features that is possible using a welding technique. Furthermore, the cosmetic quality of a metal part may be degraded as a result of a welding process. For instance, the heat associated with a welding process may alter the shape and/or the color of a metal part.

Internal features may also be formed using an injection molding process. When a manufacturing process includes an injection molding process, a through-hole may be formed in a metal part or housing, and a plastic or a resin may be injected through the through-hole. The plastic or resin may form a feature on one side of the metal part, e.g., a metal sheet, while additional plastic or resin may form an undercut on the other side of the metal sheet. The undercut, in cooperation with the plastic or resin that hardens in the through-hole, may effectively serve to anchor or otherwise hold the feature in place. Often, the side of a metal sheet on which an undercut is located may be arranged to be exposed. That is, the side of a metal sheet on which an undercut is located may be an external surface of an apparatus or device. As such, the presence of an undercut on the side of the metal sheet may be aesthetically undesirable, e.g., when the metal sheet is arranged to serve a cosmetic purpose.

Therefore, what is needed are a method and an apparatus for efficiently forming features on a metal part or sheet. That is, what is desired is a system which allows features to be formed on one side of a metal part or sheet substantially without affecting the appearance of the opposite side of the metal part or sheet.

SUMMARY OF THE INVENTION

The present invention pertains to molding a material onto a substrate that has binding features. The present invention may be implemented in numerous ways, including, but not limited to, as a method, system, device, or apparatus. Example embodiments of the present invention are discussed below.

According to one aspect of the present invention, a method for creating an assembly that includes a substrate and a molded piece involves obtaining the substrate, and forming at least one binding feature on a surface of the substrate. The method also includes molding on a surface of the binding feature and the surface of the substrate. Molding on the surface of the binding feature and the surface of the substrate mechanically binds the molded piece to the substrate.

According to another aspect of the present invention, a method for creating a substrate with a binding feature includes obtaining the substrate and creating at least one opening in the substrate. An extrudable material, e.g., a ultra violet (UV) cured glue, is back filled into the opening, and the extrudable material is extruded through the opening. Extruding the extrudable material causes the binding feature to be formed as a protrusion.

In accordance with still another aspect of the present invention, an electronic device includes an electronic component that is substantially housed within a housing. The housing includes a metal part and a molded piece. The metal part includes a first surface and a binding feature which has a binding surface. The molded piece is molded onto the first surface and the binding surface. The molded piece may include a mechanical feature.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, in which.

DETAILED DESCRIPTION OF THE INVENTION

Figure 1A:
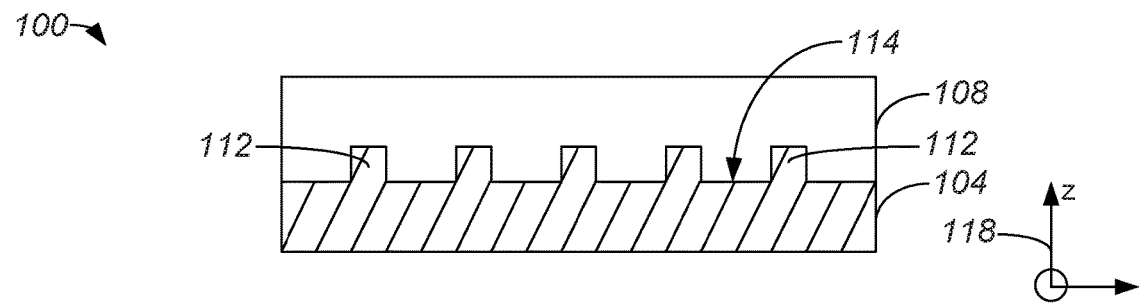
FIG. 1A is a cross-sectional side-view diagrammatic representation of an assembly that includes a metal part with squared, protruding binding features and a moldable piece molded thereon in accordance with an embodiment of the present invention.

Example embodiments of the present invention are discussed below with reference to the various figures. However, those skilled in the art will readily appreciate that the detailed description given herein with respect to these figures is for explanatory purposes, as the invention extends beyond these embodiments.

The invention relates to methods and systems for applying internal features or complex mechanical structures to a surface of a metal part, housing, or sheet. The metal part, housing, or sheet may serve a structural and/or a cosmetic purpose. That is, a metal element on which a feature or mechanical structure may be formed may have a purely structural purpose, a purely aesthetic purpose, or both a structural purpose and an aesthetic purpose. For ease of discussion, a metal element will generally be described as a metal part, although it should be appreciated that a metal element may be substantially any suitable metal component associated with a device or an apparatus, such as a housing, a sheet, or an insert.

The application of an internal feature to the surface of a metal part may include forming a moldable component, e.g., a moldable component with highly complex mechanical features. Complex mechanical features may include, but are not limited to including, structural members, frames, screw bosses, bridges, snaps, flexures, flanges, shelves, tapers, cavities, and/or pockets. A moldable component may be adhered or otherwise physically coupled to a metal part, e.g., a cosmetic metal part such as a polished metal housing, using any suitable process. By way of example, a moldable component may be adhered to a metal part using an insert molding process that effectively molds the component onto the metal part. An insert molding process may be an injection molding technique that injects molten material, such as plastic or resin, into a mold and allowing the molten material to contact and adhere to a metal part, i.e., a metal part located in the mold, as the molten material cools. The moldable material is arranged to adhere to the metal part, and may be molded to include relatively complex mechanical structures.

In one embodiment, a metal part may be a portion or a component of a housing of an electronic device. A metal part that is a portion of a housing of an electronic device may be a bezel section, a front section, and/or a back section of the housing. The metal part may be fabricated from a wide variety of metals, including, but not limited to including, alloys, stainless steel, and aluminum. Further, the metal part may be cosmetically enhanced via polishing and/or other surface improvement techniques. By way of example, a metal part may be polished stainless steel.

The ability to efficiently adhere relatively complex mechanical features to a metal part allows the integrity of a device which includes the mechanical features and the metal part to be enhanced. For instance, when mechanical feature is effectively molded with a metal part, the bond between the mechanical feature and the metal part is relatively strong. Relatively complex mechanical features that are effectively molded with a metal part may be utilized in a variety of different devices including, but not limited to including, portable and highly compact electronic devices with limited dimensions and space. In one embodiment, a device may be a laptop computer, a tablet computer, a media player, a cellular phone, a personal digital assistant (PDA), substantially any handheld electronic device, a computer mouse, a keyboard, a remote control, substantially any computer accessory, and/or substantially any computer peripheral.

Creating binding features on a surface of a metal part effectively promotes the adherence or the binding of a moldable plastic material, e.g., a moldable plastic material that may be formed to include a complex mechanical feature, to the metal part. For instance, binding features that are protrusions which extend from the surface of the metal part may allow the moldable plastic material to adhere to the protrusions and, hence, essentially have an increased binding area that allows the moldable plastic material to bind to the metal part. The additional binding or contact area between the metal part and the moldable plastic material provides a stronger bond between the metal part and the moldable plastic material. Alternatively, binding features may be undercuts or voids which effectively extend below a surface of a metal part. Such undercuts or voids also provide additional surface area to which moldable plastic may bind and, thus, adhere to the metal part.

In general, binding features, or features that enable a molded piece to mechanically interlock with a metal part, may take substantially any suitable form. With reference to FIGS. 1A-3B, examples of binding features that are used to form assemblies which include a metal part and a moldable plastic feature will be described in accordance with an embodiment of the present invention. Referring initially to FIG. 1A, an assembly, e.g., a molded metal part, that includes a metal part with squared, protruding binding features and a moldable piece molded thereon will be described in accordance with an embodiment of the present invention. An assembly 100 includes a metal part 104 on which substantially squared protrusions 112 are formed. Protrusions 112 may be integrally formed on metal part 104. Alternatively, protrusions 112 may be attached to metal part 104. Examples of processes that are suitable for forming protrusions 112 on metal part 104 will be described below with reference to FIGS. 5A-E.

Protrusions 112 generally extend past a moldable surface 114, i.e., a surface of metal part 104 onto which a molded piece 108 is to be bound. Molded piece 108 is bound to surface 114 and to protrusions 112 or, more specifically, to the surfaces of protrusions 112. In other words, molded piece 108 effectively molds around protrusions 112 and, hence, adheres to the surfaces of protrusions 112. Molded piece 108 may, in one embodiment, be arranged to include complex mechanical features (not shown).

As will be understood by those skilled in the art, extending the height of protrusions 112 relative to a z-direction 118 increases the surface area of protrusions 112. As such, increasing the height of protrusions 112 includes the overall surface area that may be used by molded piece 108 to adhere to metal part 104. Therefore, the adhesion of molded piece 108 to metal part 104 is improved as the height the surface area of a binding surface is increased.

Figure 1B:
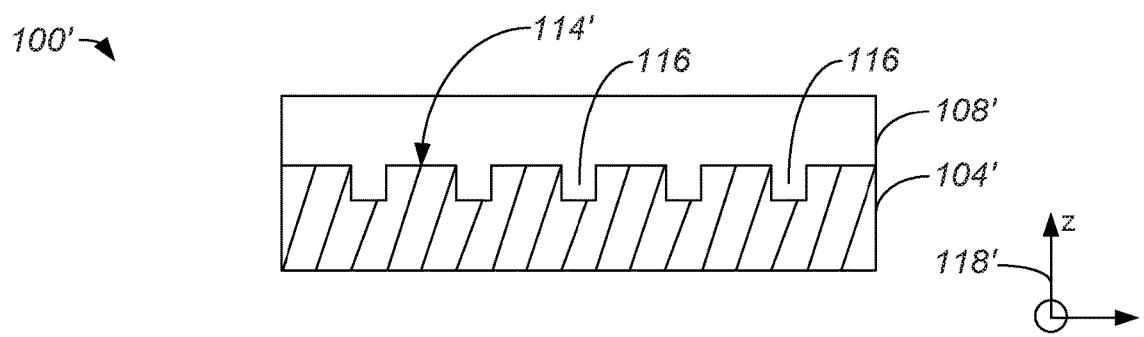
FIG. 1B is a cross-sectional side-view diagrammatic representation of an assembly that includes a metal part with squared, undercut binding features and a moldable piece molded thereon in accordance with an embodiment of the present invention.

In lieu of forming squared protrusions 112 on metal part 104, squared voids or undercuts may instead be formed on a metal part. FIG. 1B is a cross-sectional side-view diagrammatic representation of an assembly that includes a metal part with squared, undercut binding features and a moldable piece molded thereon in accordance with an embodiment of the present invention. An assembly 100' includes a metal part 104' on which substantially squared undercuts 116 are formed. The formation of undercuts will be discussed below with respect to FIGS. 7A-E.

Undercuts 116 extend below a moldable surface 114' of metal part 104'. A molded piece 108', which may include mechanical features (not shown), is bound to surface 114 and to the surfaces of undercuts 116. In general, increasing the depth of undercuts 116 with respect to a z-direction 118' increases the surface area associated with undercuts 116 and, hence, the overall surface area of metal part 104 to which molded piece 108 may adhere.

Figure 2A:
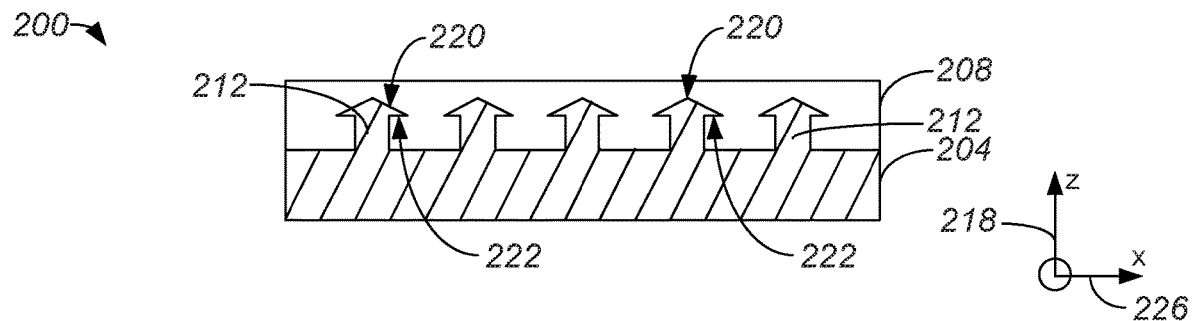
FIG. 2A is a cross-sectional side-view diagrammatic representation of an assembly that includes a metal part with angled, protruding binding features and a moldable piece molded thereon in accordance with an embodiment of the present invention.

The shape and size of binding features may be arranged to increase the surface area of a binding surface and, hence the strength of a bond between a metal part and a moldable piece. In general, the greater the surface area of a protrusion or an undercut, the larger the binding area. In one embodiment, a protrusion may include a top flange portion that effectively forms an undercut, and provides a surface onto which a moldable piece may effectively grab. FIG. 2A is a cross-sectional side-view diagrammatic representation of an assembly that includes a metal part which supports a protrusion with a top flange and a moldable piece molded thereon in accordance with an embodiment of the present invention. An assembly 200 includes a metal part 204 on which protrusions 212 with a top flange portions 220 are formed. Top flange portions 220 include undercut surfaces 222 which enable a molded piece 208 to effectively grab thereon when molded piece 208 molds around protrusions 212. Extending the height of protrusions 212 relative to a z-direction 218 increases the surface area of protrusions 212. Further, extending the width of undercut surfaces 222 relative to an x-direction 226 also increases the surface area of protrusions 212 and, hence, the overall binding surface to which molded piece 208 may be bound.

Figure 2B:
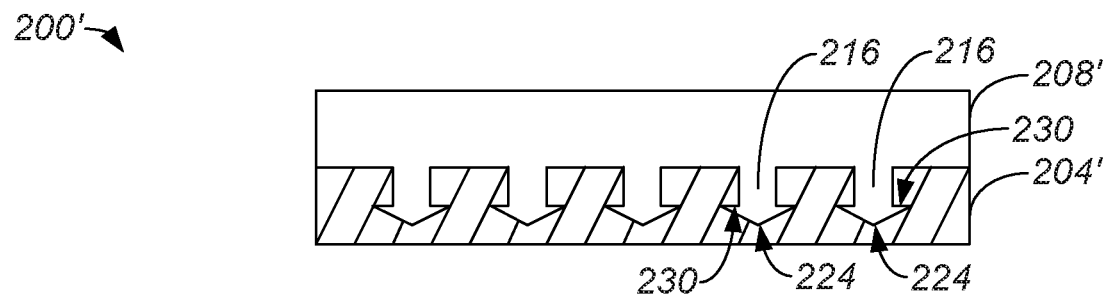
FIG. 2B is a cross-sectional side-view diagrammatic representation of an assembly that includes a metal part with angled, undercut binding features and a moldable piece molded thereon in accordance with an embodiment of the present invention.

Angled, undercut binding features that provide a surface onto which a molded piece may be bound may be provided on a metal part. FIG. 2B is a cross-sectional side-view diagrammatic representation of an assembly that includes a metal part with angled, undercut binding features and a moldable piece molded thereon in accordance with an embodiment of the present invention. An assembly 200' includes a metal part 204' on which undercuts 216 with angled bottom portions 224 are formed. Portions 224 include surfaces 230 which enable a molded piece 208 to effectively grab thereon when molded piece 208' is molded in undercuts 216.

Figure 3A:
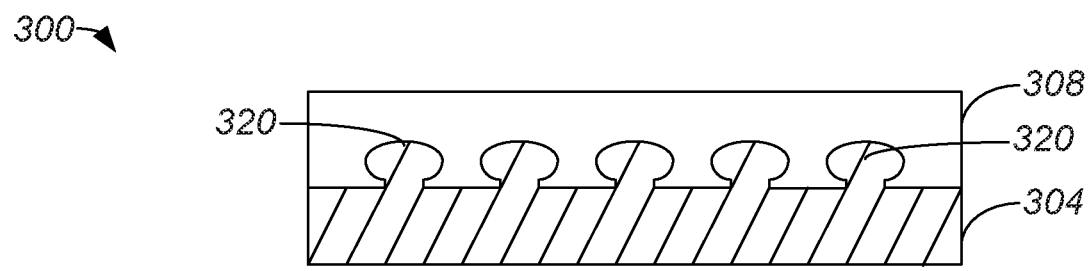
FIG. 3A is a cross-sectional side-view diagrammatic representation of an assembly that includes a metal part with rounded, protruding binding features and a moldable piece molded thereon in accordance with an embodiment of the present invention.

Protrusions and undercuts may take on a variety of different shapes that provide an increased binding surface area. In one embodiment, protrusions and undercuts may take an approximately mushroom shape, e.g., a rounded shape. FIG. 3A is a cross-sectional side-view diagrammatic representation of an assembly that includes a metal part with rounded, protruding binding features and a moldable piece molded thereon in accordance with an embodiment of the present invention. An assembly 300 includes a metal part 304 on which substantially mushroom shaped, rounded protrusions 320 are formed. When a molded piece 308 is bound to metal piece 304, molded piece 308 is bound to the surfaces of protrusions 320. That is, molded piece 308 effectively molds around protrusions 320 and, therefore, adheres to the surfaces of protrusions 320.

Figure 3B:
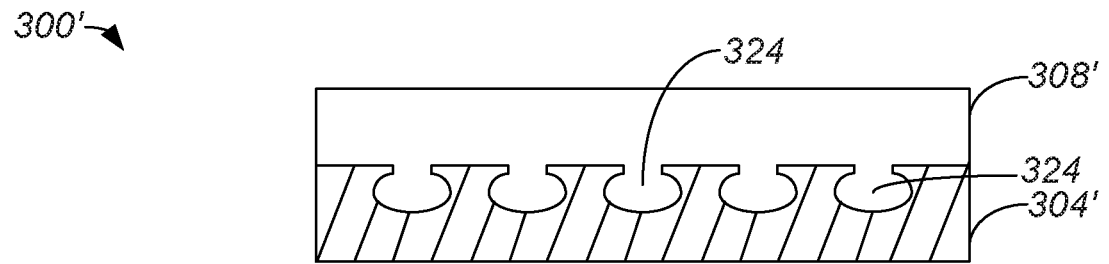
FIG. 3B is a cross-sectional side-view diagrammatic representation of an assembly that includes a metal part with rounded, undercut binding features and a moldable piece molded thereon in accordance with an embodiment of the present invention.

FIG. 3B is a cross-sectional side-view diagrammatic representation of an assembly that includes a metal part with rounded, undercut binding features and a moldable piece molded thereon in accordance with an embodiment of the present invention. An assembly 300' includes a metal part 304' on which substantially mushroom shaped, rounded undercuts 324 are formed. When a molded piece 308' is bound to metal piece 304', portions of molded piece 308' fill undercuts 324, thereby binding molded piece 308' to the surfaces of undercuts 324.

Figure 4:
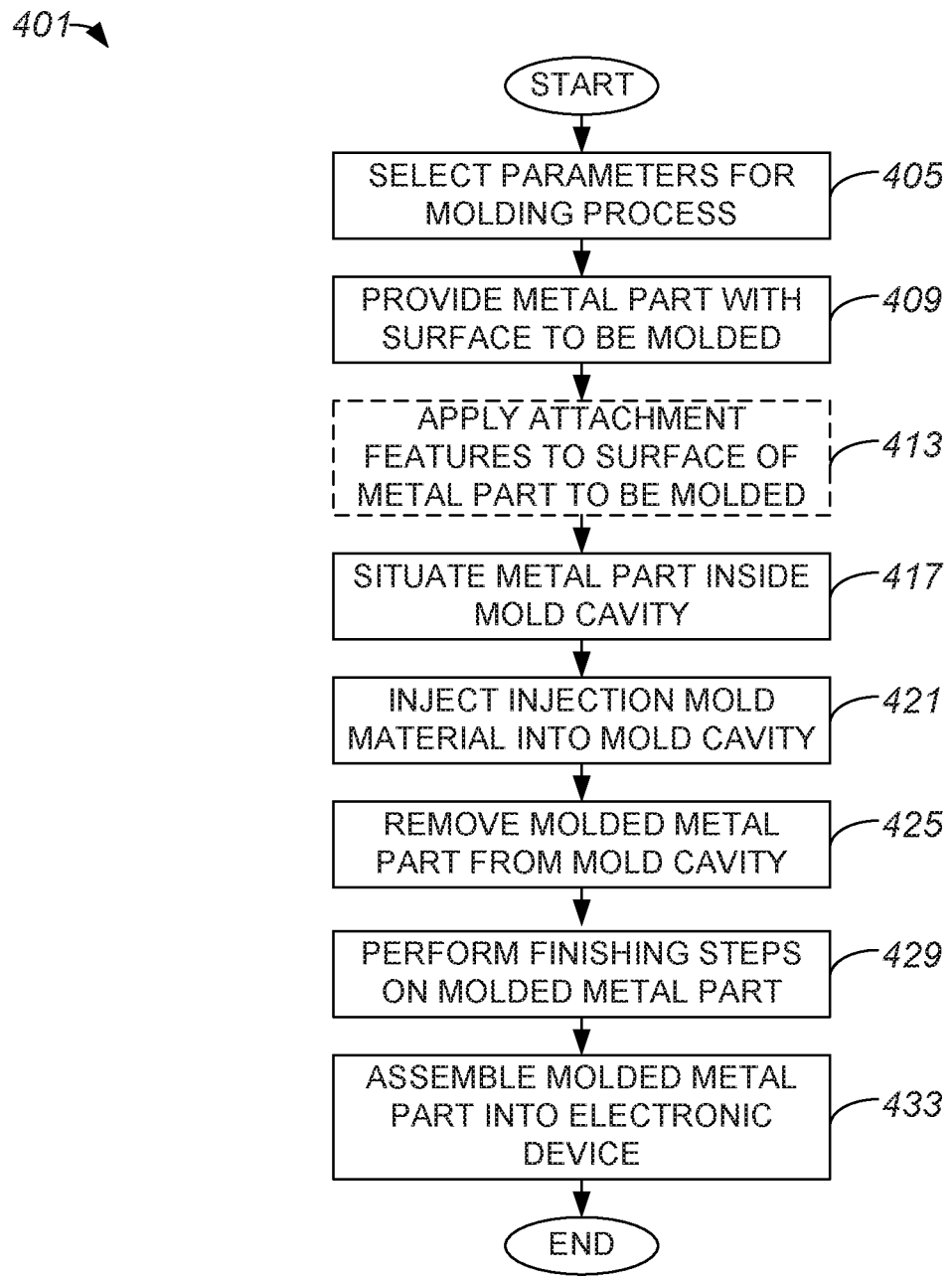
FIG. 4 is a process flow diagram which illustrates a method of forming an overall assembly that includes a metal part with a moldable piece molded thereon in accordance with an embodiment of the present invention.

FIG. 4 is a process flow diagram which illustrates a method of forming an overall assembly that is suitable for use in an electronic device and includes a metal part with a moldable piece molded thereon in accordance with an embodiment of the present invention. A process 401 of forming an overall assembly that includes a metal part and a molded piece, e.g., a molded plastic part, adhered thereto begins at step 405 in which parameters for a molding process are selected. Selecting parameters for a molding process may include, but are not limited to including, selecting injection mold parameters, selecting parameters associated with the plastic used in the molding process, and selecting metal parameters associated with the molding process. In addition, mold configuration parameters, properties of the plastic, and properties of the metal part may also be selected.

After parameters for a molding process are selected, a metal part with a surface to be molded is provided in step 409. As previously mentioned, the metal part may be a component of a device. By way of example, the metal part may be a component of a housing associated with an electronic device, or may be an insert that is intended to be incorporated into the electronic device. The surface to be molded is typically the surface of the metal part onto which a molded piece is to be adhered or otherwise bound. If the metal part is a cosmetic, external part of an electronic device, the surface to be molded is generally a surface of the metal part that is arranged to be substantially internal to the electronic device.

The surface to be molded may include attachment or binding features when obtained in step 409. However, if the surface does to be molded does not include attachment or binding features, the attachment or binding features may be applied to the surface to be molded in an optional step 413. Various methods of applying attachment or binding features to the surface of a metal part will be described below with respect to FIGS. 5A-E and FIGS. 7A-E.

The metal part is situated, as for example placed or secured, substantially within a mold cavity of a molding device in step 417. For example, the metal part may be positioned within the mold cavity when the molding device is opened. The metal part is located at a desired position relative to the mold cavity and, thus, relative to the internal moldable part that will be applied thereon. Positioning the metal part appropriately within the mold cavity may be accomplished with a robot arm associated with a robotic system. Situating the metal part substantially within the mold cavity may also include preparing the mold cavity and the metal part, adjusting the temperature associated with the molding device, and/or closing the molding device.

Once the metal part is situated in the mold cavity, injection mold material is injected in step 421 into the mold cavity. The injection mold material is generally arranged to flow into the mold cavity, to come into at least partial contact with the metal part, to harden within the mold cavity, and to adhere or otherwise attach to the metal part situated in the mold cavity. In one embodiment, a substantially molten plastic or a resin is injected into the mold cavity. The injection mold material may generally mold around attachment or binding features on the surface of the metal part. The mold cavity may be configured to define a plurality of relatively complex mechanical features. As such, the injection mold material may effectively be molded such that the relatively complex mechanical features are defined.

The injection mold material is allowed to cool, cure, harden, or otherwise set. The shape of the cured or hardened injection mold material may include relatively complex mechanical features, e.g., if the mold cavity is configured to define relatively complex mechanical features. From step 421, process flow proceeds to step 425, the metal part, with a feature formed from the injection mold material adhered thereon, is removed from the mold cavity. That is, the molded metal part which includes a metal member and a molded member is removed from the mold cavity. By way of example, once the injection mold material cures or hardens in contact with the metal part, the molding device may be opened, and the molded metal part may be substantially ejected from the molding device.

After the molded metal part is removed from the mold cavity, post processing steps may be performed on the molded metal part in step 429. Such finishing steps may include, but are not limited to including, machining, threading, forging, polishing, and/or applying a coating layer. It should be appreciated that the finishing steps may be performed either on the metal member of the molded metal part, the molded member of the molded metal part, or on the overall molded metal part. Once post processing or finishing steps are performed on the molded metal part, the molded metal part is assembled into an electronic device in step 433, and the process of forming an overall assembly that includes a metal part and a molded piece which is suitable for use in an electronic device is completed. In one embodiment, the molded metal part is a housing that is arranged to substantially encase electrical components of an electronic device.

Attachment or binding features formed on the surface of a metal part may include protrusions and undercuts. With reference to FIGS. 5A-E, methods associated with forming protrusions on the surface of a metal part to facilitate the attachment of a moldable part thereon will be described, while with reference to FIGS. 7A-E, methods associated with forming undercuts on the surface of a metal part to facilitate the attachment of a moldable part thereon will be described in accordance with an embodiment of the present invention.

Figure 5A:
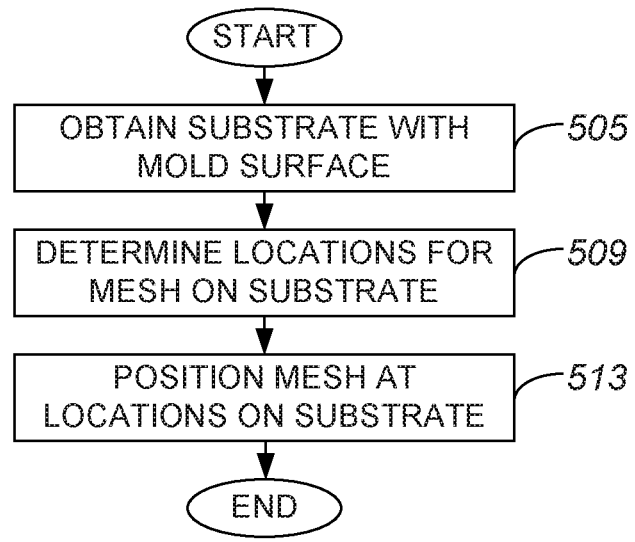
FIG. 5A is a process flow diagram which illustrates a method of forming protrusions on a metal part by overlaying a porous mesh on a surface of the metal part in accordance with an embodiment of the present invention.

FIG. 5A is a process flow diagram which illustrates a method of effectively forming protrusions on a metal part by overlaying a porous mesh on a surface of the metal part in accordance with an embodiment of the present invention. A process 501 of effectively forming protrusions begins at step 505 in which a substrate with a mold surface, i.e., a surface onto which a molded piece is to be bound, is obtained. In one embodiment, the substrate is a metal part and the mold surface is the surface of the metal part onto which a moldable piece is subsequently to be adhered. Once the substrate is obtained, locations on the substrate onto which a mesh is to be applied are determined in step 509. A mesh, which may be a metal mesh, generally includes openings that provide an attachment surface which may be molded over by a molding material. That is, a moldable material is molded around the porosity of the mesh. The use of the mesh provides additional surfaces to which the moldable material may be bound. In one embodiment, the mesh may be substantially applied over a majority of the surface of at discrete points about the surface. It should be appreciated, however, that the mesh may instead be applied at relatively few discrete points about the surface.

After locations for the mesh are determined, the mesh is positioned at such locations in step 513. Positioning the mesh at appropriate locations may include cutting the mesh and overlaying the mesh on the substrate at the appropriate locations. The mesh effectively forms protrusions to which a moldable material such as plastic or resin may subsequently bind. The process of effectively forming protrusions by overlaying a porous mesh is completed upon positioning the mesh.

Figure 5B:
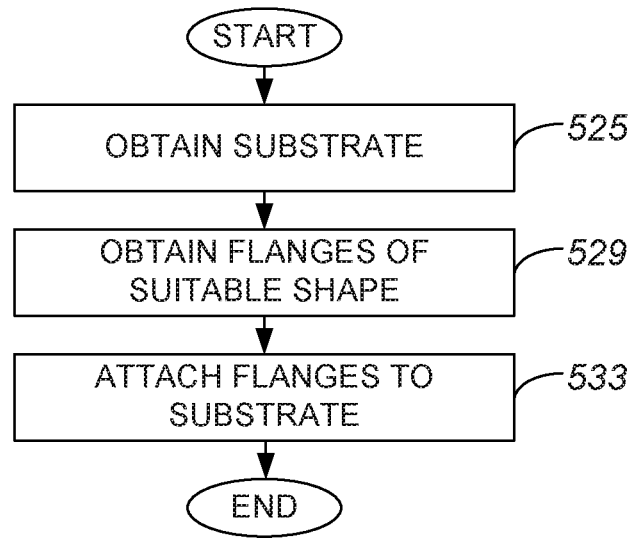
FIG. 5B is a process flow diagram which illustrates a method of forming protrusions on a metal part by attaching flanges to a surface of the metal part in accordance with an embodiment of the present invention.

FIG. 5B is a process flow diagram which illustrates a method of forming protrusions on a metal part by attaching flanges to a surface of the metal part in accordance with an embodiment of the present invention. Flanges, as will be appreciated by those skilled in the art, may have a variety of different shapes and sizes. By way of example, flanges may be "T" shaped, mushroom shaped, or rectangularly shaped. A process 521 of forming protrusions on a substrate, e.g., a metal part, using flanges begins at step 525 in which a substrate is obtained. Once the substrate is obtained, flanges of a suitable shape are obtained in step 529. The size and the shape of the flanges may vary, and the flanges may generally be formed from a wide variety of different materials. Flanges may be preformed, e.g., flanges may have a predefined shape, or flanges may be arranged to be substantially created through a soldering process. After the flanges are obtained, the flanges are attached to the substrate in step 533. In general, the methods used to attach a flange to a substrate may include, but is not limited to including, applying an adhesive to the flange and mating the flange with the substrate, and soldering the flange to the substrate. The process of forming protrusions using flanges is completed once the flanges are attached to a substrate.

Figure 5C:
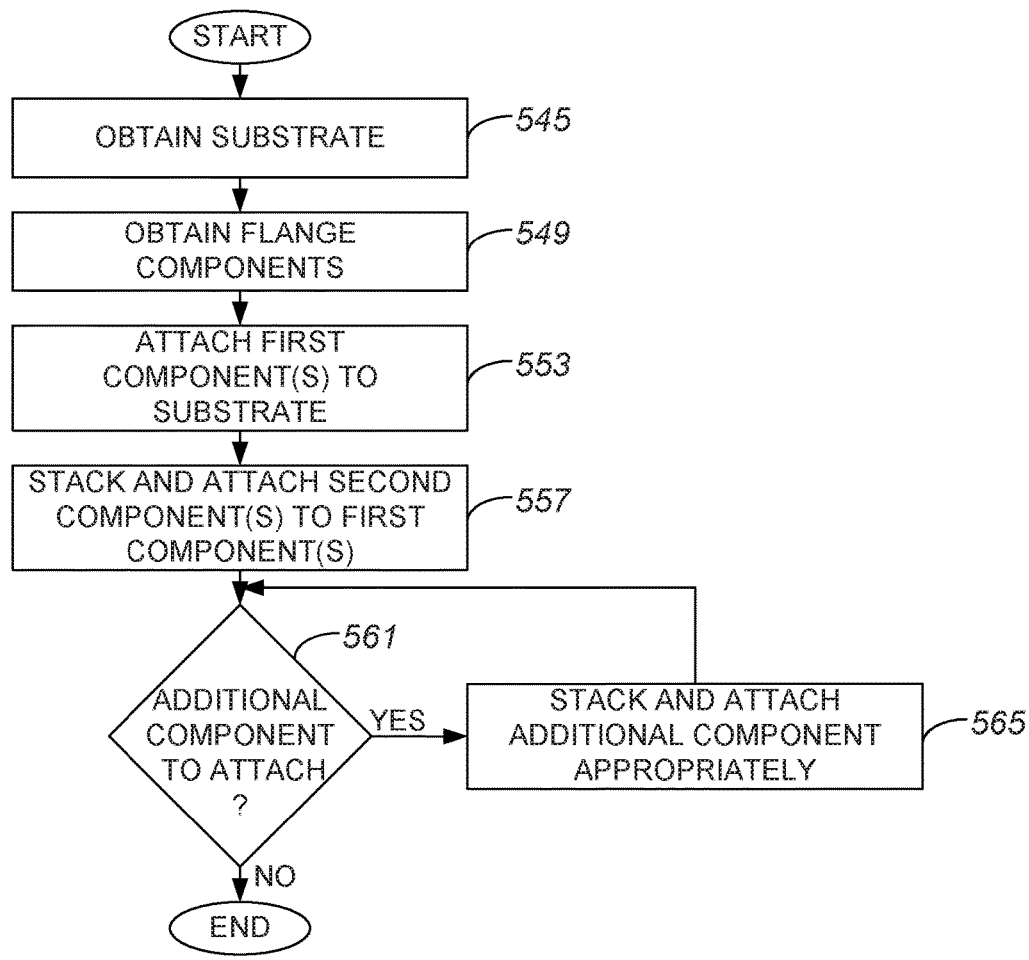
FIG. 5C is a process flow diagram which illustrates a method of forming protrusions on a metal part by substantially stacking flange components on a surface of the metal part in accordance with an embodiment of the present invention.

Flanges which are used to form protrusions on a metal part may be created from multiple layers. By way of example, a "T" shaped flange may be created from a set of rectangularly shaped layers or components. With reference to FIG. 5C, a method of forming protrusions on a metal part by substantially stacking flange components on a surface of the metal part will be described in accordance with an embodiment of the present invention. A process 541 of forming protrusions on a substrate by substantially stacking flange components begins at step 545 in which a substrate such as a metal part is obtained. Flange components are then obtained in step 549. Obtaining flange components may include obtaining different pieces or parts used to create a single flange.

Figure 6A:
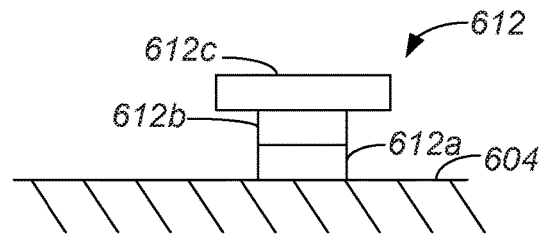
FIG. 6A is a block diagram representation of a protrusion formed by stacking flange components on a substrate in accordance with an embodiment of the present invention.

In step 553, a first component of each flange that is to form a protrusion is attached to the substrate. As shown in FIG. 6A, a first component 612a of an flange 612 is attached to a substrate 604. The first component of each flange may be attached using any suitable method. Once the first component of each flange that is to form a protrusion is attached to the substrate, a second component of each flange is stacked and attached in step 557 to the first component, e.g., using a relatively high bond adhesive. With reference to FIG. 6A, a second component 612b may be stacked on and attached to first component 612a.

After the second component of each flange is stacked on and attached to the first component of each flange, process flow proceeds to step 561 in which it is determined if there are additional components to attach. That is, it is determined whether each flange includes at least one additional component that has yet to be attached. If it is determined that there are no additional components to attach, the indication is that the protrusions on the substrate are formed, and the process of forming protrusions on a substrate by substantially stacking flange components is completed.

Alternatively, if the determination in step 561 is that there is at least one additional component to attach, the implication is that each flange includes at least one additional component. As such, in step 565, the additional component is stacked on and attached appropriately to a stack of components that is associated with a flange, e.g., stacked on and attached to the highest component in a stack of components. By way of example, a third component 612c may be stacked on and attached to component 612b of FIG. 6A. Once the additional component is attached appropriately, process flow returns to step 561 in which it is determined if there is an additional component to attach.

Figure 5D:
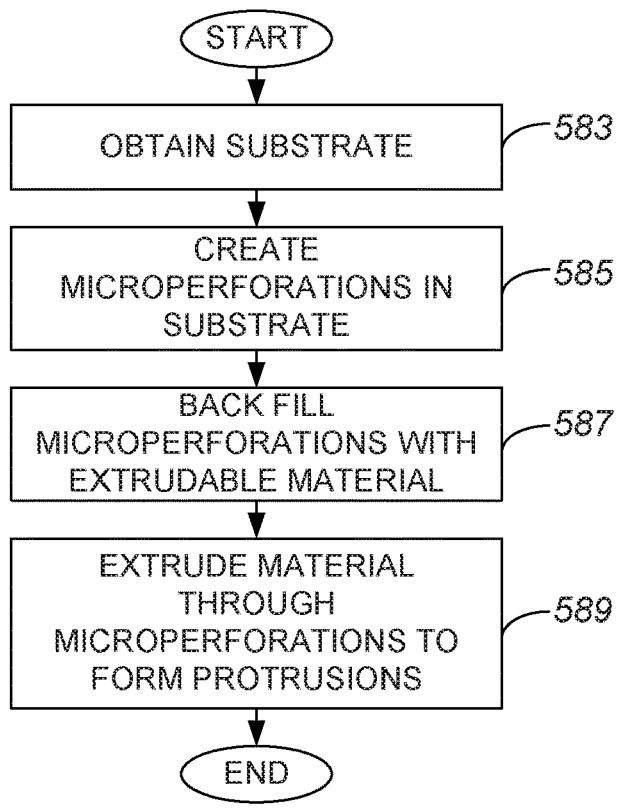
FIG. 5D is a process flow diagram which illustrates a method of forming protrusions on a metal part by back filling micro perforations defined within the metal part in accordance with an embodiment of the present invention.

In one embodiment, forming binding features that are protrusions may include extruding materials through relatively small openings, as for example micro perforations, in a substrate. FIG. 5D is a process flow diagram which illustrates a method of forming protrusions on a substrate such as a metal part by back filling micro perforations defined within the substrate and extruding the material in the micro perforations in accordance with an embodiment of the present invention. A process 581 of forming protrusions through a back filling and extrusion process begins at step 583 in which a substrate is obtained. Micro perforations are created in the substrate in step 583. A process such as a drilling process may be used to create the micro perforations. Alternatively, the micro perforations may be created using a laser or an extrusion process. Typically, the micro perforations may be of a size that essentially renders the micro perforations as substantially invisible. That is, the micro perforations may be small enough not to be readily visible to the human eye.

Figure 6B:
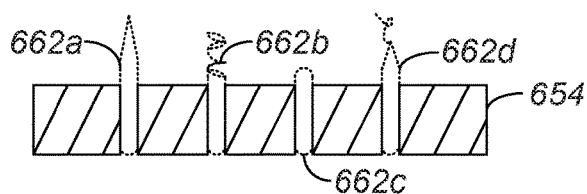
FIG. 6B is a block diagram representation of micro protrusions formed using micro perforations defined within a substrate in accordance with an embodiment of the present invention.

After the micro perforations are created in the substrate, the micro perforations are back filled in step 587 with a material that may be extruded. By way of example, the micro perforations may be back filled with an ultra violet (UV) cured glue. The material may then be extruded through the micro perforations such that protrusions are formed from the material in step 589. The shape of the protrusions formed through an extrusion process may vary widely. As shown in FIG. 6B, protrusions 662a-d formed with respect to a substrate 654 may include, but are not limited to including, a relatively elongated protrusion 662a, a curled protrusion 662b, a short protrusion 662c, and/or an relatively elongated protrusion 662d with a curled end. Bottoms of protrusions 662, as shown, generally do not extend past a bottom of substrate 654. Returning to FIG. 5D, the process of forming protrusions using back filling and extrusion is completed once the material is extruded.

Figure 5E:
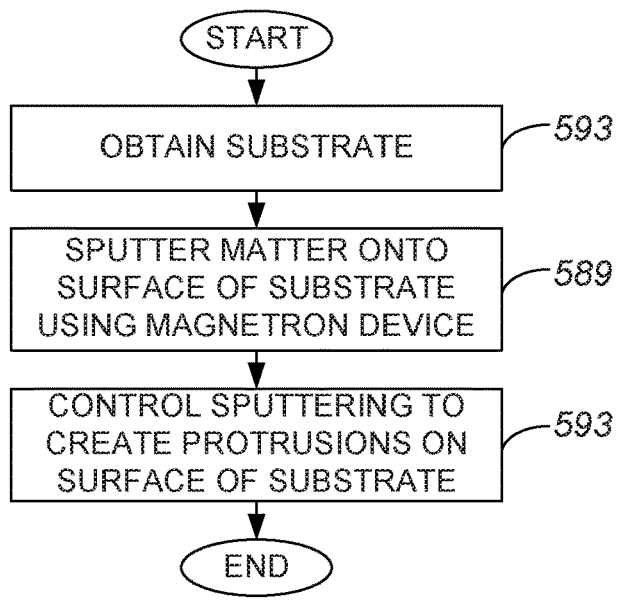
FIG. 5E is a process flow diagram which illustrates a method of forming protrusions on a metal part by sputtering matter onto a surface of the metal part in accordance with an embodiment of the present invention.

A sputtering process may also be used to form protrusions on a substrate. FIG. 5E is a process flow diagram which illustrates a method of forming protrusions on a substrate by sputtering matter onto a surface of the substrate in accordance with an embodiment of the present invention. A process 591 of creating protrusions through a sputtering process begins at step 593 in which a substrate, as for example a metal part, is obtained. Matter, e.g., matter used in bone growth sputtering, is sputtered onto a surface of a substrate using a magnetron device in step 589. The sputtering is controlled in step 593 such that chunks of the matter may form protrusions of an approximately desired shape and size. The process of creating protrusions through a sputtering process is then completed.

As previously mentioned, in lieu of creating binding features on the surface of a substrate which protrude off of the surface, binding features may be created such that the surface of a substrate is substantially undercut. In other words, binding features may include undercuts or voids located substantially below a surface of a substrate. Like the surfaces of protrusions, the surfaces of undercuts or voids in a substrate provide additional surface area to which a moldable material may bind, thereby increasing the overall strength of the bond between the moldable material and the substrate.

Figure 7A:
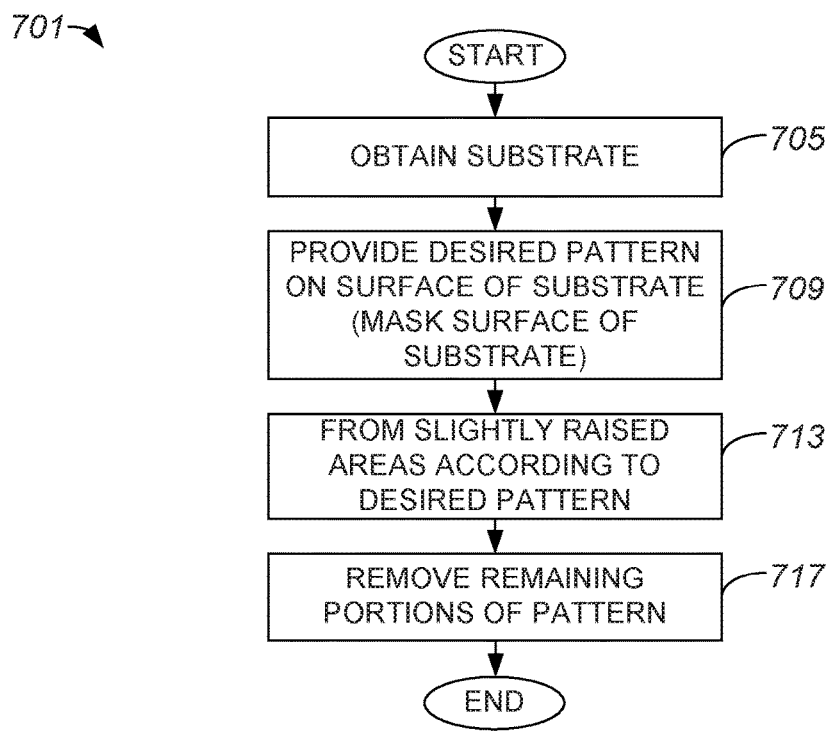
FIG. 7A is a process flow diagram which illustrates a first method of forming undercuts on a metal part that includes masking the metal part in accordance with an embodiment of the present invention.

A variety of different methods may be used to create undercuts on a metal part. FIG. 7A is a process flow diagram which illustrates a method of forming undercuts on a substrate such as a metal part that includes providing a pattern on the substrate in accordance with an embodiment of the present invention. A process 701 of forming undercuts on a substrate by providing a pattern begins at step 705 in which a substrate, e.g., a metal part, is obtained. Once the substrate is obtained, a desired pattern is provided in step 709 on the surface of the substrate in which undercuts are to be created. By way of example, the surface of the substrate is masked or screen printed. Masking a pattern allows some portions of the surface of the substrate to remain exposed, while others are effectively hidden. Screen printing allows a pattern, as for example a pattern of perforations, to be printed on the surface of the substrate such that material that is to be removed from the substrate may be identified.

After the desired pattern is applied to the surface, slightly raised areas are formed according to the desired pattern in step 713. The slightly raised areas may be formed by a process such as physical vapor disposition (PVD), for example. In one embodiment, the slightly raised areas may have an approximate mushroom shape. Once the slightly raised areas are formed, portions of the pattern that are not in contact with slightly raised areas may be removed in step 717. If the pattern is formed from screen printing, the screen printing may be washed away. When the portions of the pattern are removed, undercuts may remain under the slightly raised areas, e.g., the tops of the mushroom shaped raised areas. Upon removing the remaining portions of the pattern, the process of forming undercuts on a substrate by providing a pattern is completed.

Figure 7B:
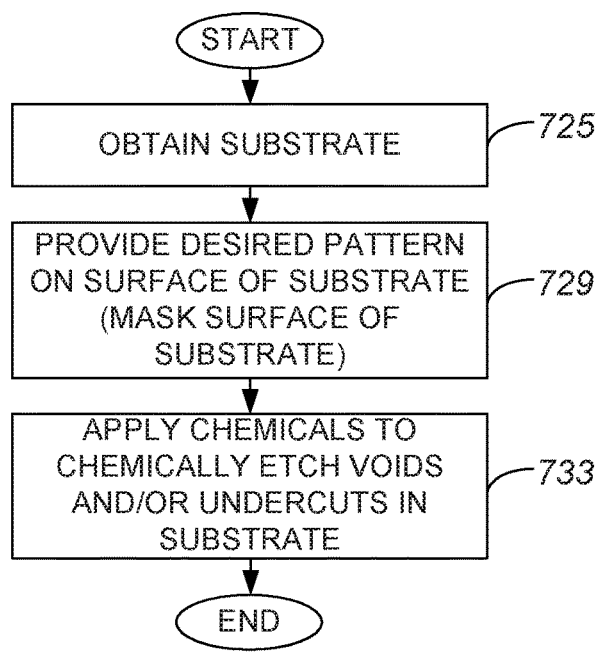
FIG. 7B is a process flow diagram which illustrates a second method of forming undercuts on a metal part that includes masking the metal part in accordance with an embodiment of the present invention.

Attachment features such as undercuts or voids may also be formed by etching, e.g., chemical and/or mechanical etching. Referring next to FIG. 7B a method of forming undercuts on a substrate that includes chemical etching will be described in accordance with an embodiment of the present invention. A process 721 of forming undercuts begins at step 725 in which a substrate is obtained. Once the substrate is obtained, a desired pattern may be provided on an appropriate surface of the substrate in step 729. In one embodiment, an appropriate surface of the substrate may be masked. After the appropriate surface of the substrate is masked or otherwise patterned, chemicals are applied in step 733 to chemically etch the substrate. The application of chemicals may create voids and/or undercuts.

It should be appreciated that a substrate may include various grains. Specific chemicals may be applied to remove portions of particular grains, while effectively leaving other grains unaffected. That is, different grains in the substrate may be attacked at different rates. The application of chemicals to chemically etch the substrate may include washing away the chemicals and the removed grains after voids and/or undercuts are created. The process of forming undercuts is completed after chemicals are applied in step 733.

Figure 7C:
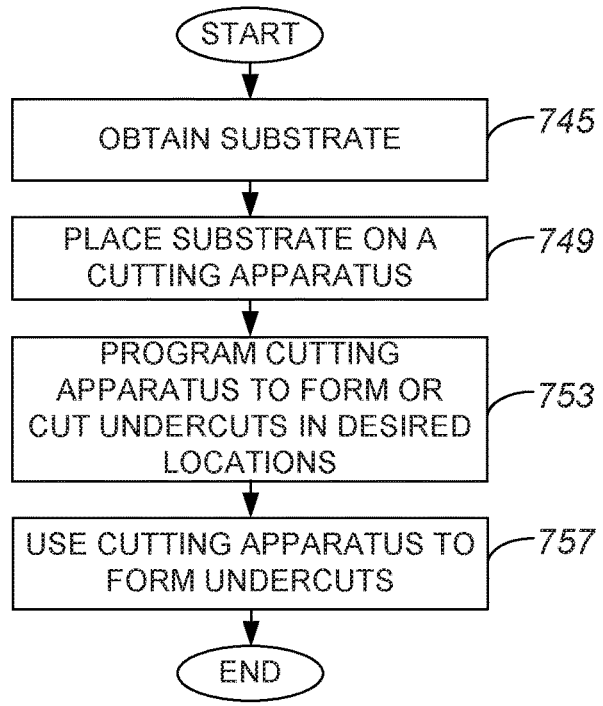
FIG. 7C is a process flow diagram which illustrates a method of creating an undercut on a metal part that includes using computer numerical control (CNC) equipment in accordance with an embodiment of the present invention.

Undercuts or voids may effectively be mechanically etched or cut into the surface of a substrate. Cutting may be performed using substantially any suitable cutting apparatus including, but not limited to including, computer numerical control (CNC) machinery that is configured to cut. FIG. 7C is a process flow diagram which illustrates a method of creating an undercut in a substrate that includes using a cutting apparatus in accordance with an embodiment of the present invention. A process 741 of creating an undercut begins at step 745 in which a substrate obtained. From step 745, process flow moves to step 749 in which the substrate is placed or otherwise positioned on a cutting apparatus. Once the substrate is placed on the cutting apparatus, the cutting apparatus may be programmed in step 753 to cut or otherwise form undercuts in desired locations. In one embodiment, the cutting apparatus may be programmed to cut "T" shaped voids or undercuts. It should be appreciated that programming a cutting apparatus may include providing the cutting apparatus with an appropriate cutting bit that may be used to cut voids or undercuts of a desired size and shape. After the cutting apparatus is programmed, the cutting apparatus is used to form undercuts in step 757. The cutting apparatus may mill, scrape, or cut away portions of the surface of the substrate to form undercuts. The process of creating an undercut is completed upon using the cutting apparatus to form undercuts.

Figure 7D:
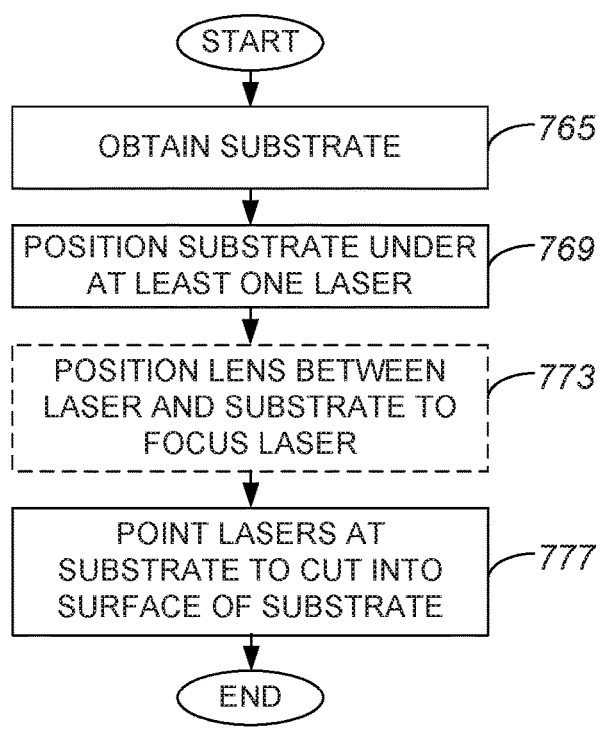
FIG. 7D is a process flow diagram which illustrates a method of creating an undercut on a metal part that includes using at least one laser in accordance with an embodiment of the present invention.

Laser cutting methods may also be used to form undercuts or voids on the surface of a substrate. FIG. 7D is a process flow diagram which illustrates a method of creating an undercut that includes using at least one laser in accordance with an embodiment of the present invention. A process 761 of creating an undercut begins at step 765 in which a substrate such as a metal part is obtained. Once the substrate is obtained, the substrate is positioned under, or in the path of, at least one laser in step 769.

In one embodiment, after the substrate is positioned, a lens may be positioned between the laser and the substrate in order to focus the laser onto appropriate sections of the substrate in step 773. That is, the lens is configured to focus the laser onto desired areas on a surface of the substrate. Step 773 is optional in that a laser may be used without a lens.

In step 777, the laser is pointed at the substrate such that the surface of the substrate may be cut into. By moving the laser and/or the substrate, an undercut or void of an appropriate size and shape may be created. After the surface of the substrate is cut into, the process of creating an undercut is completed.

Figure 7E:
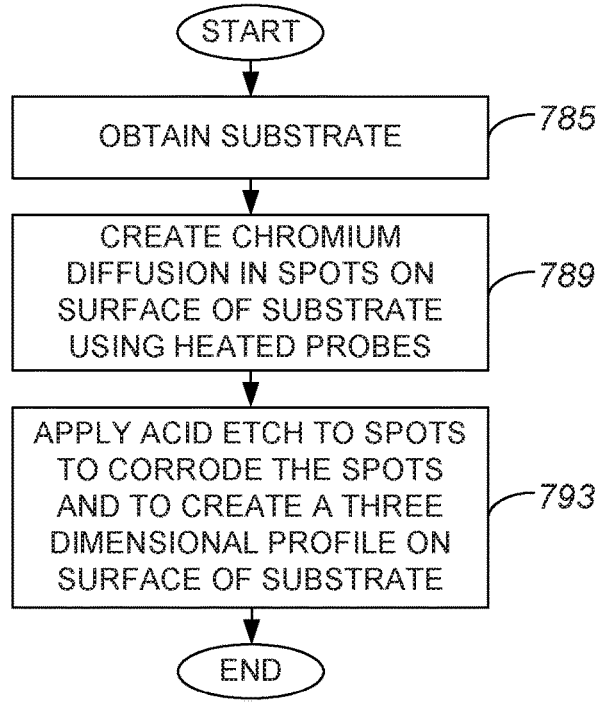
FIG. 7E is a process flow diagram which illustrates a method of creating an undercut on a metal part that includes using at least one hot probe in accordance with an embodiment of the present invention.

Sections of a substrate may be substantially directly melted away to create undercuts or voids. FIG. 7E is a process flow diagram which illustrates a method of creating an undercut in a substrate that includes using at least one hot probe to melt away portions of the substrate in accordance with an embodiment of the present invention. A process 781 of creating an undercut begins at step 785 in which a substrate is obtained. Heated probes are applied to an appropriate surface of the substrate in step 789 to create chromium diffusion in spots on the surface of the substrate. As will be appreciated by those skilled in the art, chromium diffusion may render the surface of the substrate capable of being corroded.

After chromium diffusion is created in spots, an acid etch is applied to the substrate in step 793 to cause the spots to corrode. When the spots corrode, a three-dimensional profile is effectively created on the surface of the substrate. Hence, undercuts are created on the surface. Once the spots corrode, the process of creating undercuts is completed.

Figure 8:
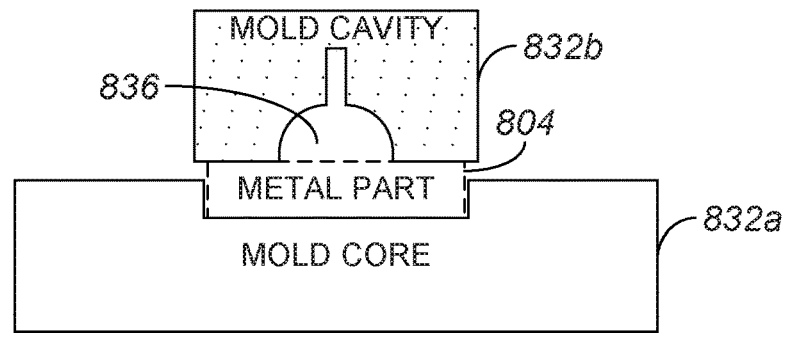
FIG. 8 is a cross-sectional side view block diagram representation of an apparatus used to mold a piece onto a metal part in accordance with an embodiment of the present invention.

As mentioned above, a molded metal part that includes a metal member and a moldable member may be created through the use of a molding device. One example of a molding device will be described with reference to FIG. 8. FIG. 8 is a cross-sectional side view block diagram representation of a molding device used to create a molded metal part in accordance with an embodiment of the present invention. A molding device or mold 832 includes a mold core 832*a* and a mold cavity 832*b*. A metal part 804 onto which a moldable piece is to be molded is arranged to be held by mold core 832*a*. A mold cavity 832*b* includes an opening 836 into which a moldable material, e.g., a molten plastic, may be injected. Opening 836 is arranged to be positioned over metal part 804 such that a molded piece may be formed over and bound to metal part 804. The shape and size of opening 836 may vary widely. In one embodiment, opening 836 is shaped such that complex mechanical features may be formed from moldable material (not shown) which is cured or hardened within opening 836.

Figure 9A:
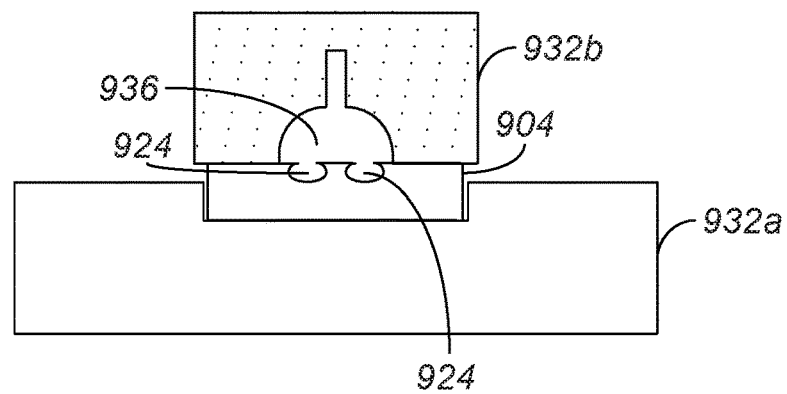
FIG. 9A is a cross-sectional side view block diagram representation of an apparatus used to mold a piece onto a metal part that includes undercuts in accordance with an embodiment of the present invention.
Figure 9B:
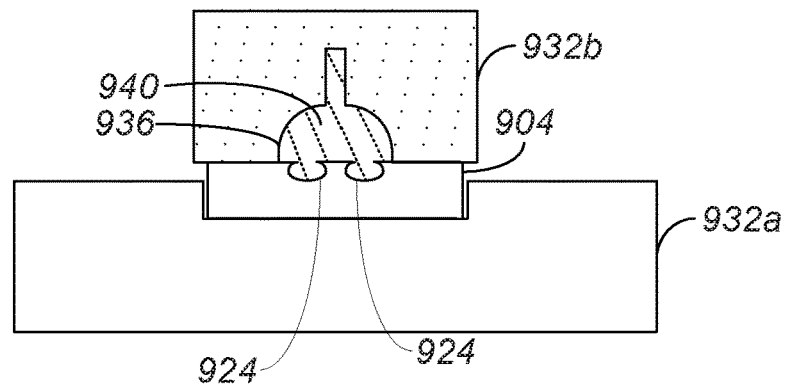
FIG. 9B is a cross-sectional side view block diagram representation of a metal part, e.g., metal part 904 of FIG. 9A, interfaced with a mold cavity onto which a moldable material has been provided in accordance with an embodiment of the present invention.
Figure 9C:
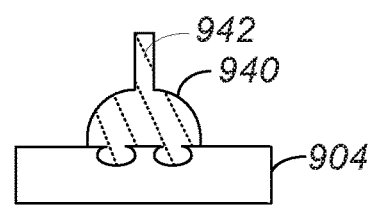
FIG. 9C is a cross-sectional side view block diagram representation of a metal part, e.g., metal part 904 of FIG. 9A, onto which a molded part has been substantially attached in accordance with an embodiment of the present invention.

With reference to FIGS. 9A-C, a process of creating a molded metal part using a molding device such as molding device 832 of FIG. 8 will be described in accordance with an embodiment of the present invention. FIG. 9A is a cross-sectional side view block diagram representation of a molding device used to bind a moldable piece onto a metal part that includes undercuts in accordance with an embodiment of the present invention. A molding device 932 includes a mold core 932*a* and a mold cavity 932*b*. Mold cavity 932*b* includes an opening 936. A metal part 904 that includes undercuts 924 is held by mold core 932*a*, while mold cavity 932*b* is positioned over metal part 904 such that opening 936 is arranged substantially over undercuts 924.

As shown in FIG. 9B, a material 940 may be injected into opening 936. Injecting material 940 into opening 936 includes causing material 940 to effectively fill undercuts 924. Material 940 may be a molten plastic or a resin that is arranged to cure or otherwise harden when cooled. When material 940 cools, material 940 effectively forms a molded piece that is bound to metal part 904. Once material 940 cools, an overall molded metal part that includes material 940 and metal part 904 is effectively created. Material 940 is bound or otherwise adhered to metal part 904, as shown in FIG. 9C. Material 940 may have a shape that is formed by the contours of opening 936. Such a shape may include at least one relatively complex mechanical feature 942.

The shape and size of binding features may vary widely. In addition, the spacing between adjacent binding features may vary. By way of example, the shape and the dimensions associated with undercuts or voids may vary depending upon the requirements of a particle system. In general, the depth of an undercut or void is less than or approximately equal to the thickness of a substrate or metal part. For a void that is approximately equal to the thickness of a substrate, when a moldable material is provided in the void such that a protrusion is effectively formed on a top surface of the substrate, the moldable material does not protrude past the bottom surface of the substrate. In other words, moldable material substantially only protrudes out of one end of a void. To efficiently prevent moldable material from protruding past the bottom surface of a substrate, voids may be shaped such that moldable material may be substantially prevented from flowing out of the bottom of the void. In one embodiment, a void that may prevent moldable material from flowing out of the bottom of the void may be substantially tapered, e.g., may have a substantially conical shape.

Figure 10:
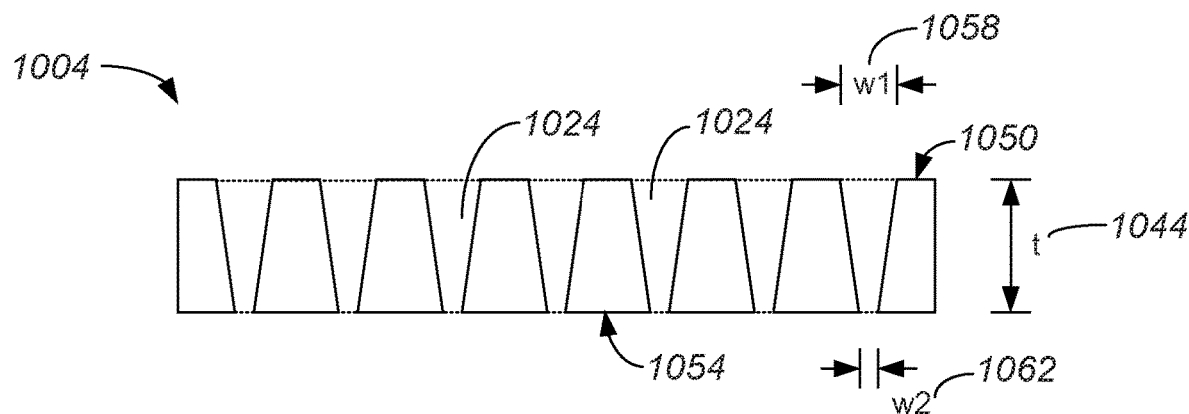
FIG. 10 is a cross-sectional side view diagrammatic representation of a metal part into which tapered perforations have been provided in accordance with an embodiment of the present invention.

FIG. 10 is a cross-sectional side view diagrammatic representation of a metal part into which tapered voids have been formed in accordance with an embodiment of the present invention. A metal part 1004 has a height or a thickness "t" 1044. Typically, a void or undercut may have a height that is less than or approximately equal to thickness "t" 1044. In the embodiment as shown, voids 1024 have a height that is approximately equal to thickness "t" 1044. Voids 1024 are tapered or substantially conical in shape, such that at a top surface 1050, voids 1024 have a width "w1" 1058, and at a bottom surface 1054, voids 1024 have a width "w2" 1062. Width "w1" 1058 is generally larger than width "w2" 1062.

Although only a few embodiments of the present invention have been described, it should be understood that the present invention may be embodied in many other specific forms without departing from the spirit or the scope of the present invention. By way of example, while the present invention has been described in terms of metal parts, the present invention is not limited to being used with respect to metal parts. Rather than being formed from metal, a substrate onto which features are to be adhered may be fabricated from other materials including, but not limited to including, glass or ceramic.

A moldable material from which features are formed may be formed from substantially any suitable plastic or resin. For instance, a moldable material may be formed from a plastic such as polycarbonate or acrylonitrile butadiene styrene (ABS). It should be appreciated that a moldable material is not limited to being a plastic or a resin. By way of example, a moldable material may be an injectable ceramic, or a moldable or injectable metal such as Liquid-Metal. Liquid metals, and the use thereof, are described in U.S. Provisional Application No. 60/949,449, filed Jul. 12, 2007, and entitled "INSERT MOLDING LIQUID METAL AROUND GLASS," which is hereby incorporated herein by reference in its entirety.

While the surface of a metal part which is to be bound to a moldable part has generally been described as including either protrusions or undercuts, the surface of a metal part is not limited to including either protrusions or undercuts. For instance, the surface of a metal part to which a moldable part is to be adhered may include both protrusions and undercuts. Further, the sizes and the shapes of protrusions and undercuts associated with the surface of a metal part may vary. In one embodiment, protrusions of different shapes and/or undercuts of different shapes may be associated with a single metal part.

The steps associated with the methods of the present invention may vary widely. Steps may be added, removed, altered, combined, and reordered without departing from the spirit of the scope of the present invention. By way of example, chemically etching undercuts and/or voids in a substrate may include applying a first set of chemicals to etch peaks and valleys on the surface of a substrate, providing a liquid in the valleys, polishing the surface, and then applying a second set of chemicals that "eats" the liquid in the valleys at different rates than the surface to create undercuts. Therefore, the present examples are to be considered as illustrative and not restrictive, and the invention is not to be limited to the details given herein, but may be modified within the scope of the appended claims.

What is claimed is:

1. A housing for a mobile phone, comprising:
a metal part defining:
- a cosmetic exterior surface of the housing;
- a bonding region internal to the housing; and
- a plurality of recesses formed into the metal part along the bonding region, a recess of the plurality of recesses defined by: an opening in the bonding region of the metal part; and a chamber in communication with the opening, the opening being narrower than the chamber to define an undercut; and a molded plastic piece contacting the metal part and having portions extending into each recess of the plurality of undercut recesses to affix the molded plastic piece to the metal part; wherein a thickness of a first portion of the metal part defined between a surface of the chamber and the cosmetic exterior surface of the housing is less than a thickness of a second portion of the metal part adjacent the recess.

2. The housing of claim 1, wherein the metal part and the molded plastic piece cooperate to define a smooth surface.

3. The housing of claim 1, wherein;
the metal part is a first metal part; and
the molded plastic piece is further affixed to a second metal part.

4. The housing of claim 1, wherein the recess of the plurality of recesses is defined in cross-section by at least one curved surface.

5. The housing of claim 1, wherein the plurality of recesses are formed by chemical etching.

6. The housing of claim 1, wherein the recess of the plurality of recesses is defined by a machined recess surface.

7. The housing of claim 1, wherein the molded plastic piece fills the chamber and the opening.

8. A mobile phone, comprising:
a housing comprising:
a metal part defining:
- an exterior surface of the housing; and
- a void machined into the metal part and defining: an opening; and a chamber in communication with the opening, the opening being narrower than the chamber to define an undercut; and a unitary molded plastic piece filling the void and engaging the undercut to retain the unitary molded plastic piece to the metal part; and a plurality of electronic components contained within the housing; wherein a first portion of the metal part that defines the void is thinner than a second portion of the metal part adjacent the void.

9. The mobile phone of claim 8, wherein the metal part and the unitary molded plastic piece cooperate to define a smooth surface.

10. The mobile phone of claim 8, wherein:
the void defines:
- a first void region; and
- a second void region contiguous with the first void region;
the second void region is undercut with respect to the first void region; and
the unitary molded plastic piece occupies the first void region and the second void region.

11. The mobile phone of claim 8, wherein the metal part is formed of stainless steel or aluminum.

12. The mobile phone of claim 8, wherein the unitary molded plastic piece is formed from a nonconductive plastic.

13. The mobile phone of claim 8, wherein:
the void is a first void;
the metal part further defines a second void; and
the unitary molded plastic piece further fills the second void.

14. A handheld electronic device, comprising:
a housing structure, comprising:
a metal part defining:
- at least a portion of an internal volume of the handheld electronic device;
- an exterior surface of the handheld electronic device; and
- a recess defined by: an opening in the metal part; and a chamber in communication with the opening, the opening being narrower than the chamber to define and undercut; and a unitary plastic piece having a portion formed within the recess and retained to the metal part via the undercut, the unitary plastic piece defining a portion of an internal surface of the housing structure; and a plurality of electronic components within the internal volume; wherein a first portion of the metal part that defines the recess is thinner than a second portion of the metal part adjacent the recess.

15. The handheld electronic device of claim 14, wherein the unitary plastic piece defines a screw boss having an opening configured to receive a screw.

16. The handheld electronic device of claim 14, wherein the recess is formed by chemical etching.

17. The handheld electronic device of claim 14, wherein the recess is formed by machining.

18. The handheld electronic device of claim 17, wherein:
the metal part defines a plurality of additional recesses; and
the unitary plastic piece extends into the plurality of additional recesses.

* * * * *